Aug. 2, 1932.    R. H. HELSEL    1,869,849
CHECK PUNCHING AND ISSUING MACHINE
Filed Sept. 9, 1930   9 Sheets-Sheet 1

Aug. 2, 1932.  R. H. HELSEL  1,869,849

CHECK PUNCHING AND ISSUING MACHINE

Filed Sept. 9, 1930   9 Sheets-Sheet 4

INVENTOR
Reuben H. Helsel
BY
Marshall & Hawley,
ATTORNEYS

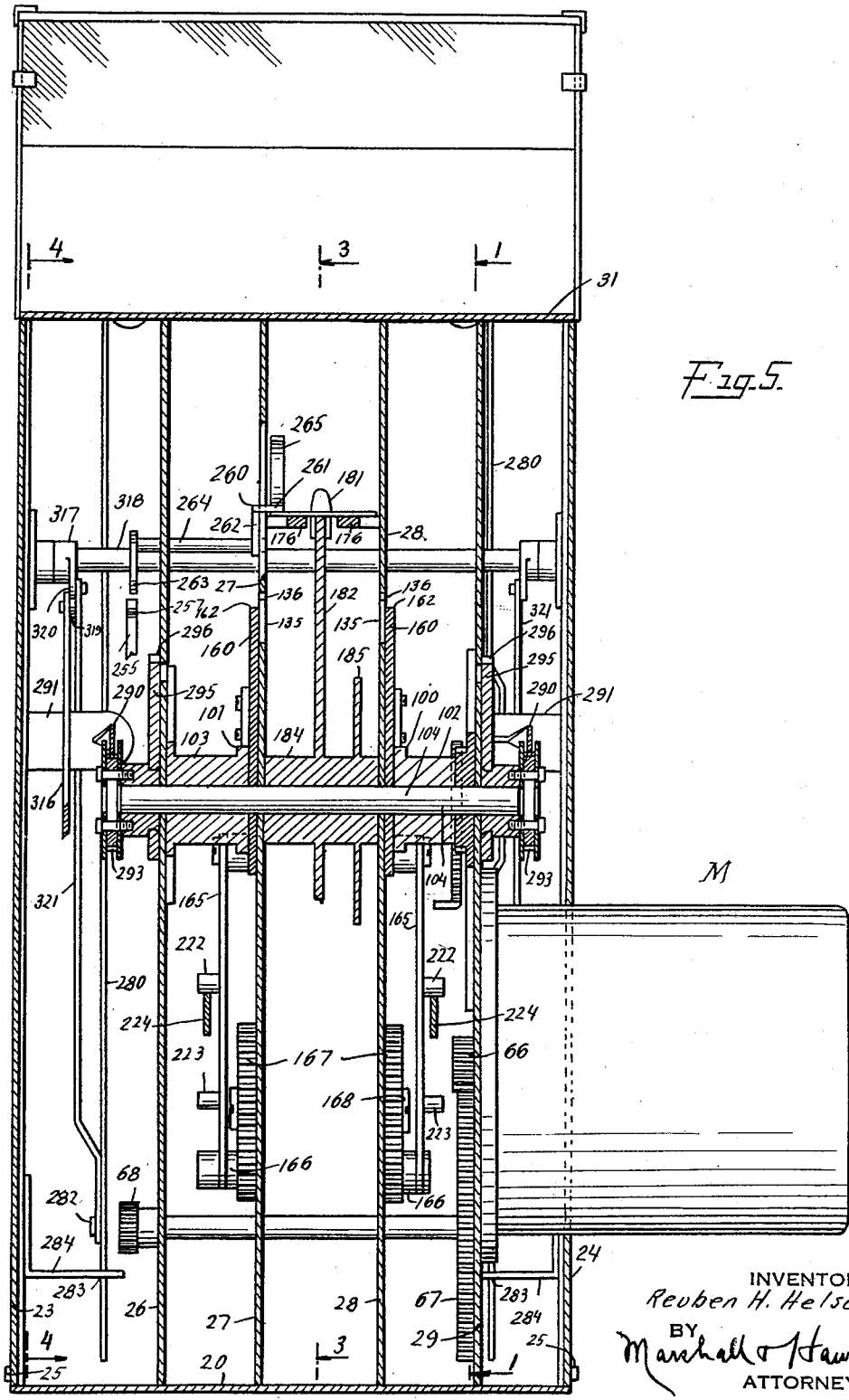

Aug. 2, 1932.  R. H. HELSEL  1,869,849
CHECK PUNCHING AND ISSUING MACHINE
Filed Sept. 9, 1930   9 Sheets-Sheet 6
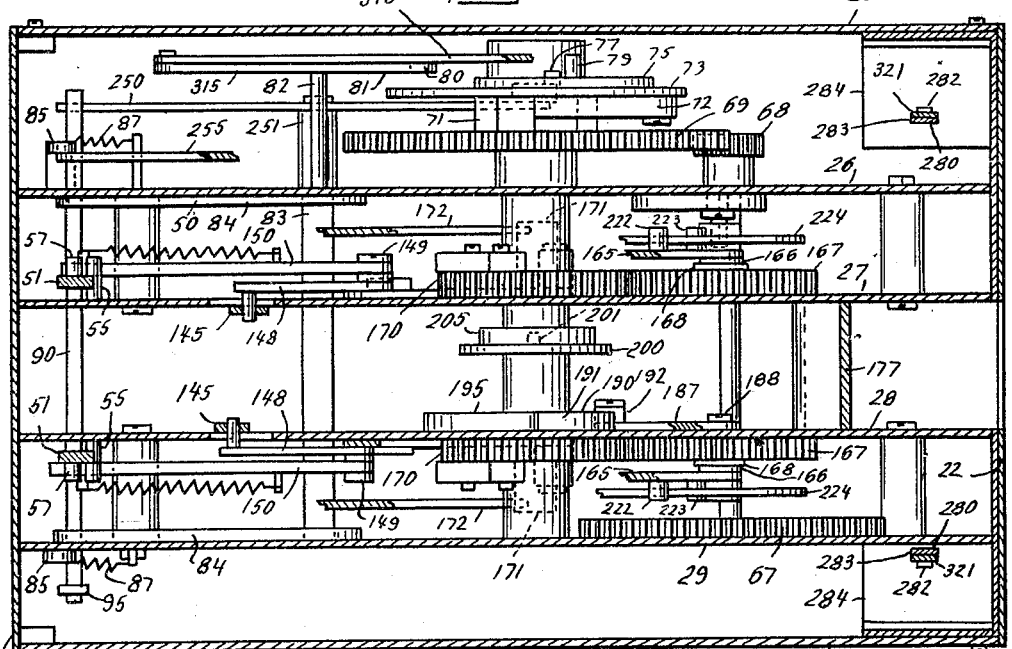
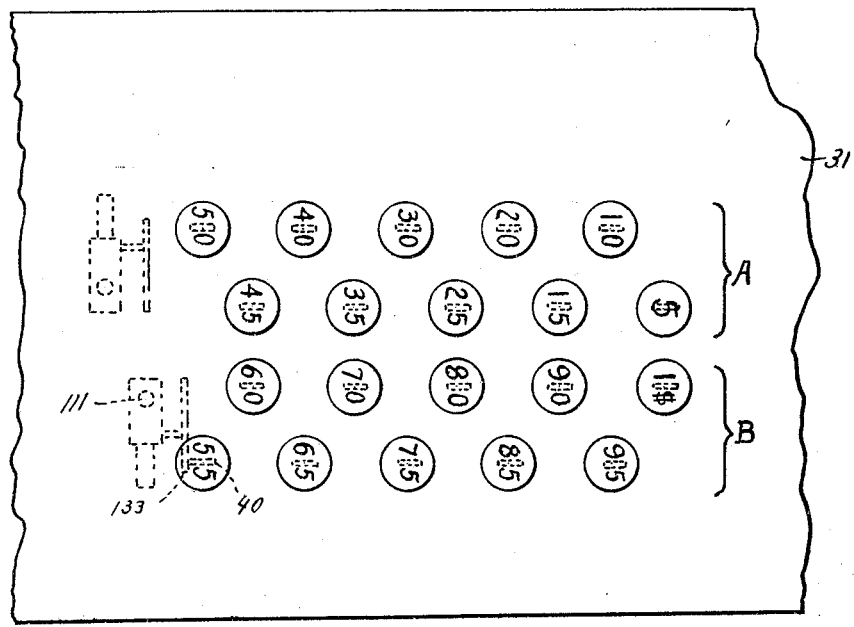
INVENTOR
Reuben H. Helsel
BY
Marshall & Hawley
ATTORNEYS Aug. 2, 1932. R. H. HELSEL 1,869,849
CHECK PUNCHING AND ISSUING MACHINE
Filed Sept. 9, 1930 9 Sheets-Sheet 8

INVENTOR
Reuben H. Helsel
BY
Marshall Hawley,
ATTORNEYS

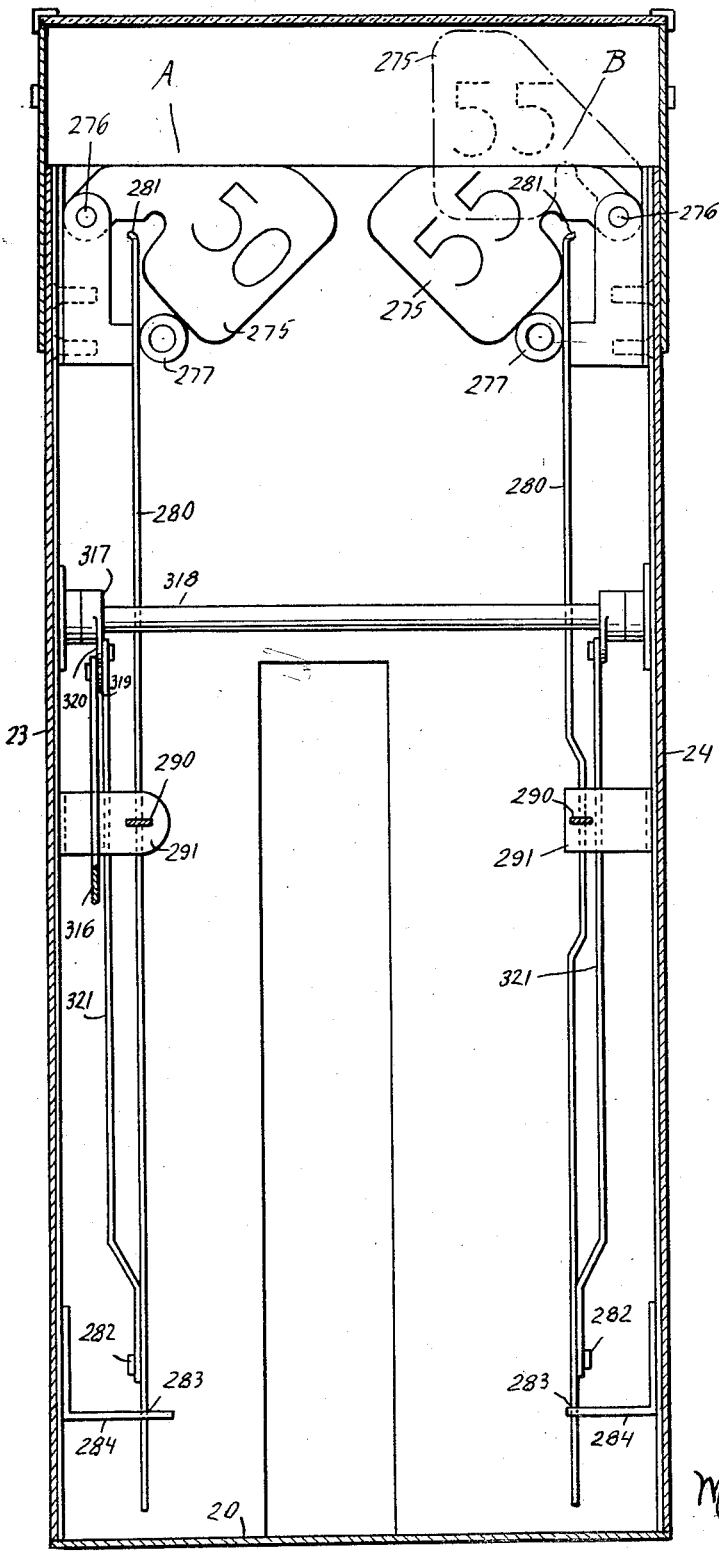

Patented Aug. 2, 1932

1,869,849

UNITED STATES PATENT OFFICE

REUBEN H. HELSEL, OF LONG ISLAND CITY, NEW YORK, ASSIGNOR TO GENERAL REGISTER CORPORATION, OF BROOKLYN, NEW YORK, A CORPORATION OF PENNSYLVANIA

CHECK PUNCHING AND ISSUING MACHINE

Application filed September 9, 1930. Serial No. 480,659.

This invention relates to check issuing machines, and particularly to machines for punching and issuing checks such as are used in restaurants, although it should be understood that the machine is not limited to any such specific use.

A machine of the character mentioned is provided with means for supporting and feeding a strip of checks or tickets, means for designating on the checks predetermined amounts, selector keys or devices for determining the amounts designated, and means for severing and delivering the checks from the strip.

This invention has for its salient object to provide a machine of the character described with means for indicating to the customer the amount registered on the check.

Another object of the invention is to provide indicators or flashers corresponding to the various selector keys and means, set in operation when any key is depressed or actuated, for visibly indicating the amount determined by the key.

Further objects of the invention will appear from the following specification taken in connection with the drawings, which form a part of this application, and in which Fig. 1 is a sectional side elevation taken substantially on line 1—1 of Figs. 2 and 5, parts of the casing being broken away to show further operative parts;

Fig. 5 is a sectional elevation taken substantially on line 5—5 of Fig. 1;

Fig. 6 is a sectional plan view taken substantially on line 6—6 of Fig. 1;

Fig. 7 is a fragmentary development of the top of the keyboard showing in dotted lines the punch mechanism, arrested by key "55", of one of the sets of keys, but the other punch mechanism being disposed in inactive position;

Fig. 8 is a plan view of a ticket issued by the machine;

Fig. 12 is a vertical sectional elevation showing the indicators or flashers and a part of the operative means therefor.

Figure 1:
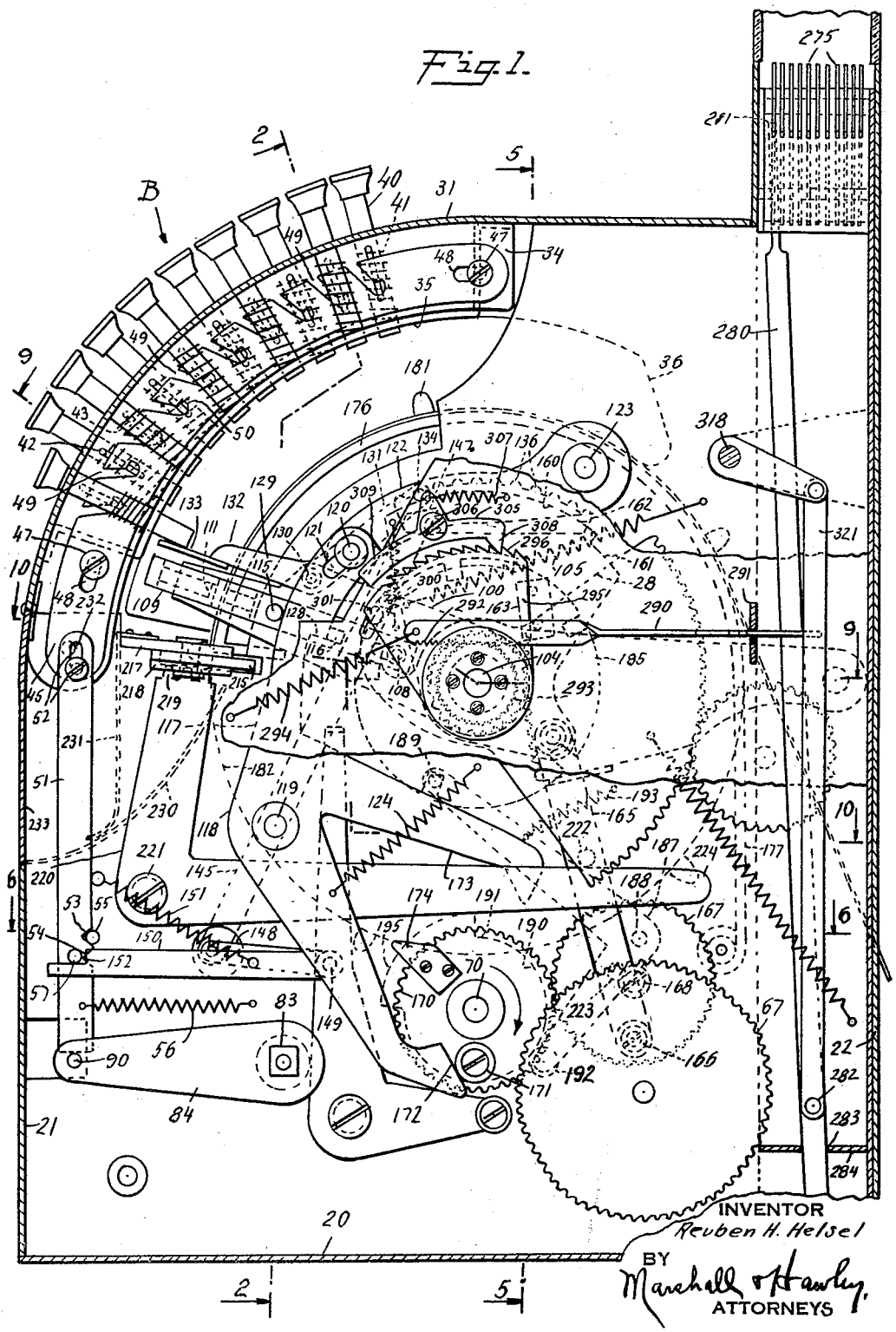

The invention briefly described consists of a machine having a plurality of sets of selector keys and punch mechanism for each set of keys operative upon a check to indicate thereon the amount purchased. The keys of each set are constructed and arranged to set in operation a plurality of operative parts which after being set in operation, function automatically, complete their cycles of operation and return to their initial position. Upon the depression of one of the keys in one of the sets of keys, the punch mechanism is moved to operative position corresponding to the key depressed and a motor is set in operation. The motor is geared to an operating shaft which by means of various cams causes the actuation of the punch mechanism, the feeding of the check strip, the severing of a check from a strip of checks, and the return of the various operative parts to their position of rest or to their initial positions. Means is provided for automatically connecting the operating shaft to the motor drive upon the depression of a key and for automatically disconnecting the shaft from the motor drive when the various parts have completed their cycles of operation and returned to their initial positions. Means is also provided for locking the check strip feeding mechanism during the punching and check severing operations and for releasing this locking means when the check strip is fed subsequent to the punching operation.

The machine is also provided with means for locking the keys and operative parts against movement when the check or ticket strip is exhausted.

The invention furthermore embodies means for automatically indicating to each customer after a sale or as a check is issued, the amount punched or printed thereon. In the particular machine shown, the indicating means consists of a flasher which is raised and exposed to view. A separate flasher is provided for each amount within the range of the machine and the flashers are selectively operated by means controlled by the position of the punching mechanism.

Further details of the invention will appear from the following description.

Since the operation of the indicators or flashers is dependent on the operation of the other parts of the machine, the entire machine has been illustrated and will be described.

In the embodiment of the invention illustrated, the machine is housed in a casing having a bottom 20, a front wall 21 extending upwardly for a portion of the length of the casing, a rear wall 22 and side walls 23 and 24. These parts can be made and secured together in any desired manner, as by screws 25 (see Figs. 2 and 5).

The casing has secured therein partitions 26, 27, 28 and 29, the operative mechanism being mounted on these partitions or frame members and the partitions being securely connected to the casing and also being connected together by shafts, spindles and other parts hereinafter described.

Selector keys and control bars

A plurality of sets of selector keys indicated on Fig. 7 as A and B are carried by a cover 31 which encloses the upper front portion of the casing and can be locked thereon in any suitable manner.

Figure 2:
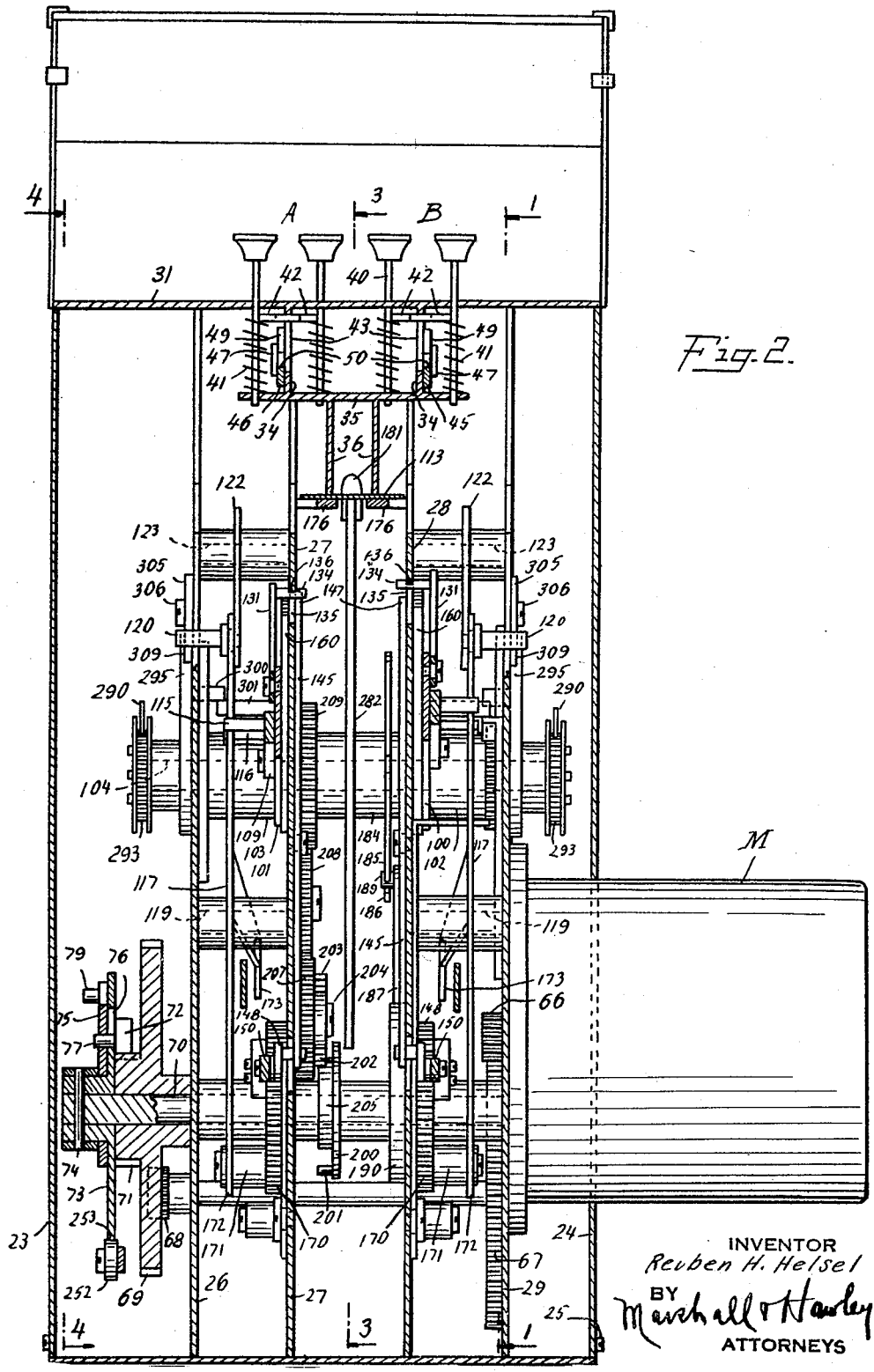
Fig. 2 is a sectional front elevation taken substantially on line 2—2 of Fig. 1.

As shown in Fig. 2, the cover 31 has formed thereon or secured thereto, downwardly extending webs 34, and a plate 35 curved in section and corresponding in curvature to the cover 31 is secured to the lower ends of the webs 34. Parallel webs 36 extend inwardly and downwardly from the plates 35 and are disposed between the upper portions of the partitions 27 and 28.

The keys 40 are slidably mounted in the cover 31 and plate 35 and are normally resiliently retained in their extended position, as shown in Fig. 2, by means of springs 41 which engage the plate 35 at their inner ends and engage at their outer ends laterally extending lugs or pins 42 carried by the keys.

The pins 42 are limited in their movement by means of slots 43 formed in the webs 34, the outer ends of the pins being disposed in the slots. The pins and slots also form additional guides for the keys 40.

The entire operating mechanism of the machine is controlled by a pair of control bars 45 and 46. These bars are carried by the webs 34 and are slidably mounted thereon by means of pins or screws 47 which are secured to the web and extend through slots 48 formed in the control bars.

Figure 4:
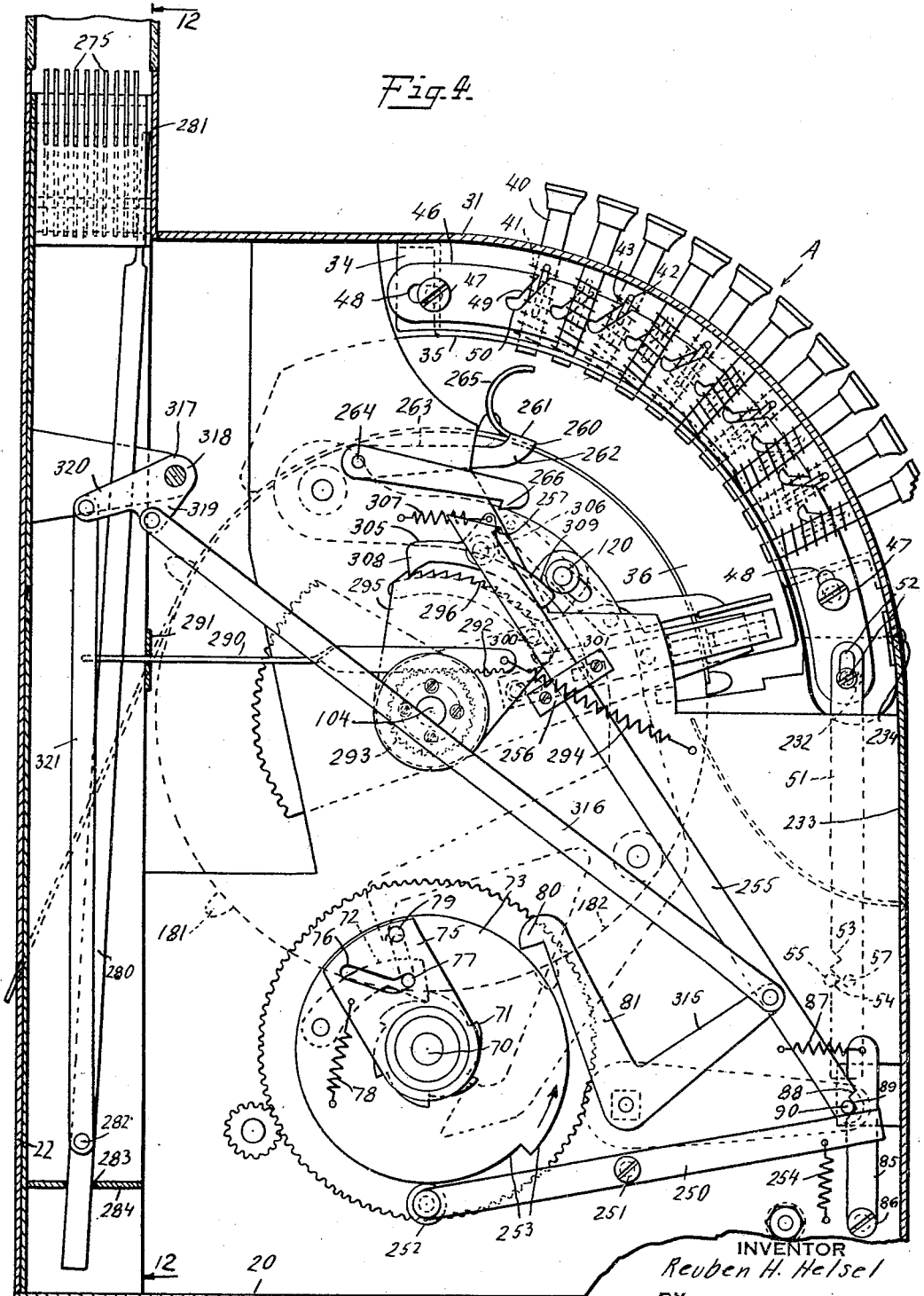
Fig. 4 is a sectional elevation taken substantially on line 4—4 of Figs. 2 and 5.

Each of the bars has formed in its upper edge a plurality of inclined elongated notches 49, the outer ends of these notches being normally disposed, as shown in Fig. 4, in position to receive the end portions of the pins 42 carried by the keys 40. The notches at their inner ends are enlarged or recessed, as shown at 50.

In operation, when one of the keys of the set B is depressed, the pin 42 carried by the shank of the key will enter the notch disposed opposite the pin and because of the inclination of the notch will cause the control bar 45 to be depressed to the position shown in Fig. 1. This depression of the control bar sets in operation the various operative parts of the machine, causing these parts to move through their cycles of movement and to return to their initial positions without further attention by the operator. Attention is called to the fact that when one of the keys has been depressed, shifting the bar, the pin 42 of the key will be disposed in the recess 50, thereby preventing the key from returning to its initial position and also the shifting of the bar will dispose the portions of the bar between the notches beneath the other pins 42, thereby preventing operation thereof.

Each of the control bars 45, 46 has secured to its lower end an arm 51 and the two arms 51 are slotted at their upper ends and are connected to the bars by a pin and slot connection, as shown at 52.

Each arm 51 has two notches 53, 54 on its inner edge, adapted to receive a pin 55 projecting from partition 27 or from partition 28. The arms are engaged by and held against the pins 55 by springs 56. Each arm also has a pin 57 projecting laterally therefrom, the function of these pins being hereinafter explained.

Drive mechanism

Any suitable power may be used for operating the machine and in the embodiment of the invention shown, a motor M is mounted on the partition 29 and extends outwardly through one of the side walls of the casing. The motor shaft 65 operates gearing 66, 67, 68 and 69, the gear 69 being rotatably mounted on a shaft 70. (See Fig. 11.)

Gear 69, however, is not keyed to the shaft but, as shown in Figs. 2 and 4, is connected thereto by means of a clutch comprising a ratchet 71 formed on the gear and a pawl 72 carried by a disk 73, the disk being pinned to the shaft, as shown at 74. (See Fig. 2.) The movement of the pawl 72 into operative relation with respect to the ratchet 71 is controlled by a plate 75 rotatably mounted on the hub of the disk 73 and having an inclined cam slot 76 which receives a pin 77 secured to and extending laterally from the pawl 72. The plate 75 is resiliently moved in one direction by a spring 78, one end of the spring being secured to the disk 73 and the other end being secured to the plate 75.

Plate 75 has formed thereon a lug 79 which extends outwardly therefrom into the path of a latching lug 80 carried by an arm 81 which in turn is carried by a shaft 82. Shaft 82 is squared, as shown at 83, throughout a portion of its length and the squared portion has mounted thereon a pair of arms 84. The arms 84 at their opposite ends carry a spindle or shaft 90 which is disposed below and in the path of movement of arms 51.

When the control bars 45 and arms 51 are depressed in the manner above described, the shaft 90 is engaged by arms 51 and depressed and the depression of the shaft causes the depression of the free ends of the arms 84, thereby rotating the shaft 82 in a clockwise direction to an extent sufficient to cause the latch 80 to release the lug 79 carried by the plate 75. When this lug is released from the latch, the plate 75 will be swung in a counterclockwise direction (see Fig. 4), causing the pin 77 carried by the pawl 72 to travel downwardly in the slot 76 or toward the axis of the plate and into operative poistion with respect to the ratchet 71.

The spindle or shaft 90 is non-positively retained in its upper and lower positions by means of latches 85 pivoted at 86 and resiliently actuated in one direction by springs 87. The latches 85 are provided with a pair of notches 88 and 89 for retaining the spindle in its two positions of movement.

Lock mechanism

Means is provided for throwing out the pawl and ratchet clutch and for locking the keys against operation when the ticket strip has been used and the machine is empty.

This means is illustrated in Fig. 4 and comprises a lever 250 pivoted at 251 and having a roller 252 at one end engaging a cam 253 formed on the periphery of disk 73. The roller is maintained in engagement with the cam by a spring 254 which tends to swing the lever in a clockwise direction about its pivot 251. The other end of lever 250 engages rod or shaft 90.

Rod 90 has mounted thereon a feeler bar 255 which is slidable in a guide 256 and has a hook or lug 257 at its upper end.

The cam and lever reciprocate the bar 255 up and down each revolution of the disk 73 and cam 253.

As shown in Figs. 4 and 5, a detector 260 is provided with a projection 261 that normally rests on the ticket strip and is maintained in elevated position thereby. The detector consists of two arms 262 and 263 connected by a rod 264 pivoted in frame members 26 and 27.

A finger grip or handle 265 is connected to projection 261. The arm 263 has a hook 266 on its free end adapted to extend into the path of hook 257 when the strip is exhausted and the arms 262 and 263 are permitted to drop.

Operation of lock

When the arms 262 and 263 of the detector 260 drop, the hook 266 will engage the hook 257 and hold the bar 255 in elevated position, thus causing lug 80 to throw out the clutch. Also, the rod 90 will be elevated and will prevent depression of bars 51, thus preventing any further operation of the selector keys until a new ticket strip is placed in the machine.

As described in the next paragraph, the elevation of rod 90 will also disconnect the source of power from the motor.

Motor control

The motor circuit is normally open but is automatically closed upon the depression of one of the keys in the following manner.

Figure 11:
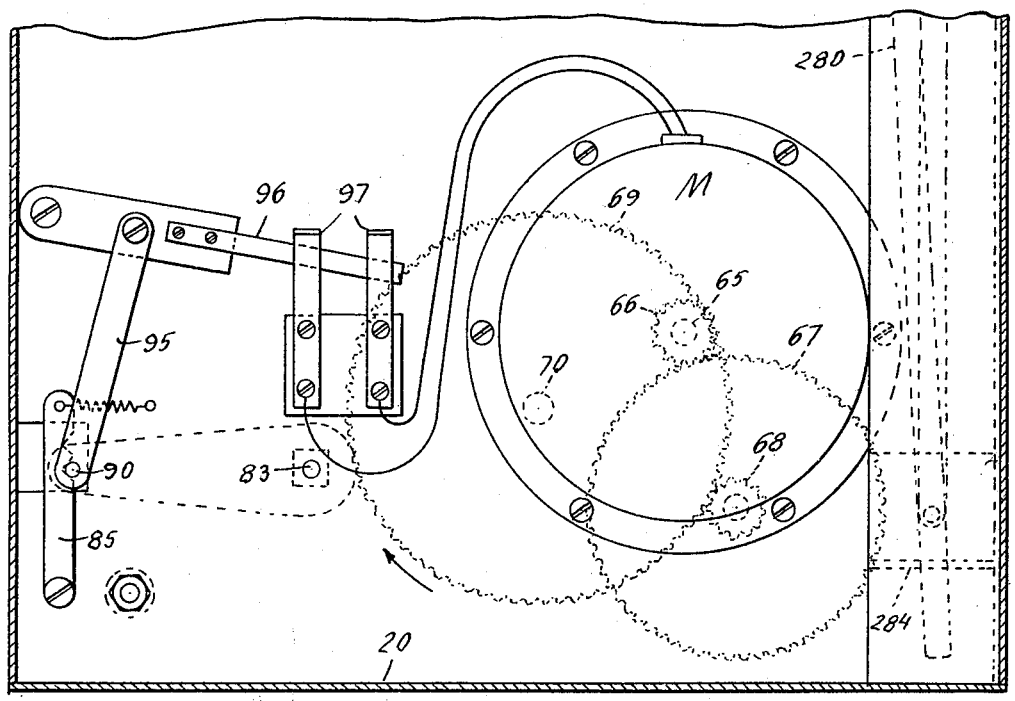
Fig. 11 is a sectional detail view showing the motor and switch for controlling the motor and operating means for the switch.

As shown in Fig. 11, the spindle or shaft 90 has mounted thereon a link 95 which is connected at its upper end to a knife switch having a blade 96 and contact terminals 97. This switch controls the power circuit for the motor and when the switch is closed, the motor is operative. Thus it will be seen that as the key is depressed, thereby depressing the control bar, arm 51 and shaft 90, the motor switch is closed and the motor begins to operate. The depression of the shaft 90 also causes the pawl 72 to move into operative relation with respect to ratchet 71, thereby connecting the shaft 70 to the motor-actuated spring.

The elevation of the spindle or rod 90 by the locking mechanism will open the switch 96 and stop the motor.

Punch mechanism

Punch mechanism is provided for each set of selector keys. The punch mechanisms, as shown particularly in Figs. 1 and 9, comprise arms 100 and 101 carried by hubs or sleeves 102, 103 on a shaft 104. A spring 105 is connected to each arm and tends to swing the arm about its pivot in a clockwise direction. Each arm 100, 101 has an inwardly extending lug 106 provided with a perforation 107 to receive the punch and each arm also has slidably mounted thereon by a pin and slot connection 108, a punch frame 109. The punch frame 109 has an angular extension 110 at one end which carries the punch 111 and the punch is guided in its reciprocatory movement by a lug 112 formed on the arm 100 and spaced from the lug 106 to permit the passage of the ticket 113 between these two lugs.

Figure 9:
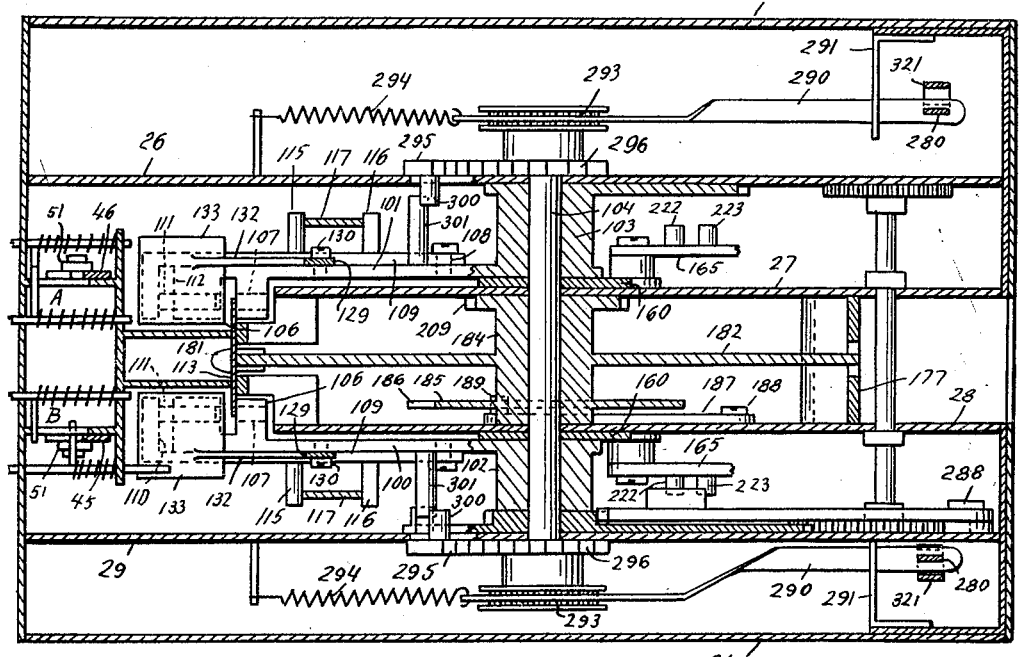
Fig. 9 is a sectional plan view taken substantially on line 9—9 of Fig. 1 and illustrating particularly the punch mechanism.

Each punch frame 109 has secured thereto and extending laterally therefrom, a pair of lugs 115 and 116. These lugs, as shown in Figs. 1 and 9, are positioned on opposite sides of an arm 117 of a lever 118 pivoted at 119 and adapted to control the actuation and retraction of the punch.

Each of the arms 117 of the levers is connected by a pin and slot connection 120, 121 to an arm 122 pivoted at 123. Each lever 118 is normally swung about its pivot in an anti-clockwise direction by means of a spring 124.

Figure 3:
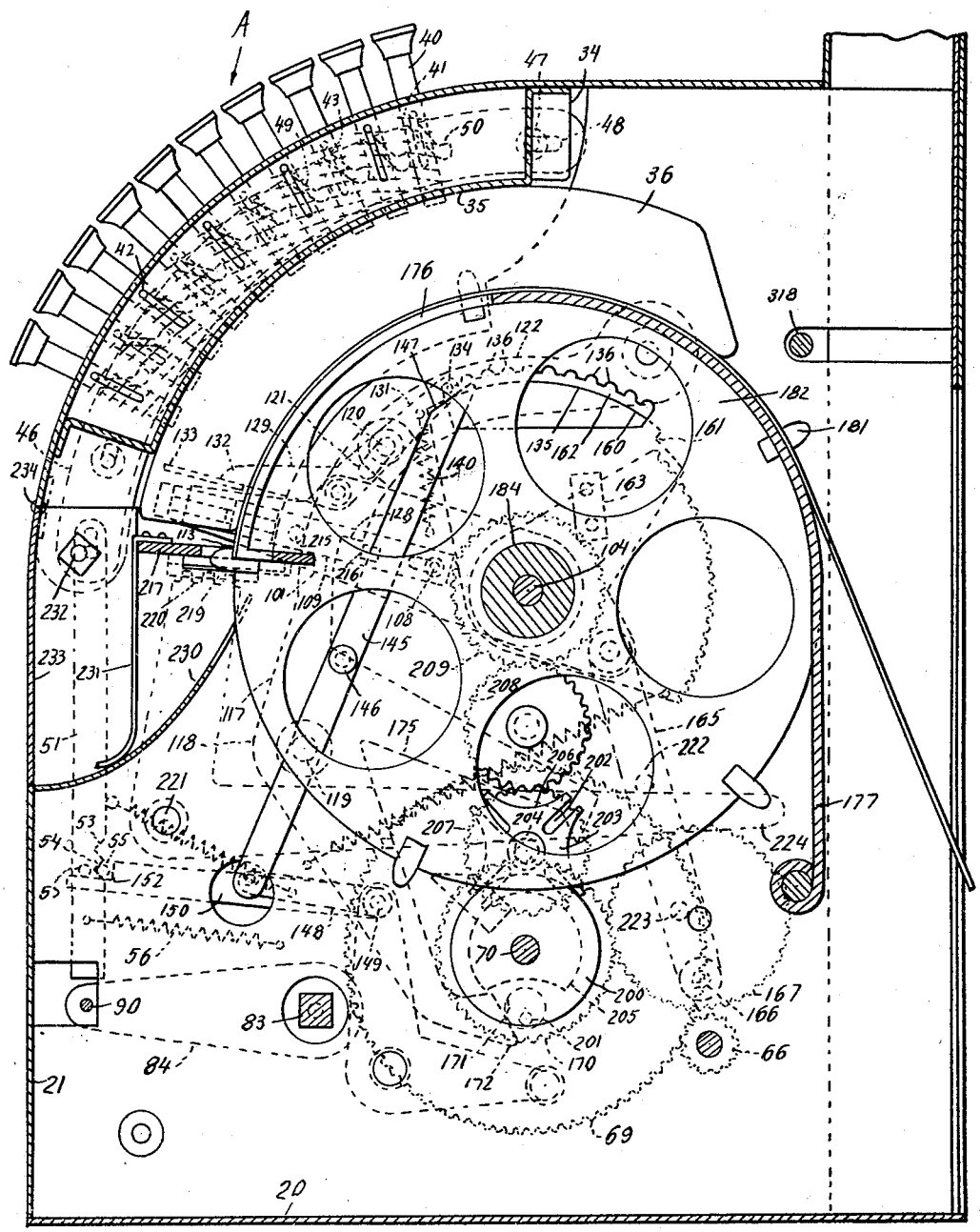
Fig. 3 is a sectional side elevation taken substantially on line 3—3 of Figs. 2 and 5.

The inner surface of each arm 117 is provided with a recess or cut-away portion 128 which, as shown in Fig. 3, is normally positioned opposite the lug 116, this being the relative position of these parts when none of the keys has been depressed. When, however, one of the keys, as the key "55", has been depressed, as shown in Fig. 1, the lug 116 of the punch controlled by that set of keys is disposed in position to be actuated by the lever 118.

*Punch lock mechanism*

Each of the punch mechanisms is normally locked in inoperative position as the position shown in dotted lines in Fig. 3. In order to lock each punch mechanism in inoperative position, there is pivotally mounted at 130 on each of the arms 100, 101, a bell crank lever 129 having an upwardly extending arm 131 and a laterally extending arm 132. A plate 133 is secured to each arm 132 and is adapted to be engaged by a depressed key, as shown in Fig. 1.

Each arm 131 has secured adjacent the upper end thereof, a laterally and inwardly extending lug or pin 134, these pins extending into slots 135 formed in the partitions 27 and 28. (See Fig. 3.) The upper edges of these slots are provided with a plurality of recesses 136, one recess being provided for each amount or each key of each of the sets of keys, and an additional recess being provided for holding the punch in inoperative position.

A spring 140 engages the arm 131 of each bell crank lever and tends to swing the lever in a direction to release the pin 134 from the recesses.

Two separate means are provided for holding the pin of each bell crank in one of the recesses of the slot.

In Fig. 3 there is shown a lever 145 pivoted at 146 and having its upper end 147 disposed in a position to engage one of the pins 134 and force this pin upwardly into the left hand recess.

The lower end of the lever 145 has connected thereto a link 148 which in turn is pivoted at 149 to a link 150. The link 150 is supported by a spring 151 which tends to move the link laterally to the left (as shown in Fig. 1). The end of the link 150 is provided with a notch 152 adapted to engage and receive either pin 55 or pin 57. When the keys of one set are all disposed in retracted position or in position to be operated, as shown in Fig. 3, the notch 152 of the arm 150 will engage pin 55, thus holding the upper end 147 of the lever 145 associated with the group of keys of the set under consideration in position to retain the locking pin 134 of the bell crank lever 129 corresponding with that set of keys in locking position.

When one of the keys is depressed, as shown in Fig. 1, thus depressing the bar 51 corresponding to that set of keys, the link 150 will be forced downwardly and will be pulled to the left by the spring 151, thus swinging the lever 145 in a clockwise direction about its pivot and releasing the locking pin corresponding to the set of selector keys which includes the depressed key.

Another lock is also provided, this lock consisting of a sector 160 pivoted as shown in Fig. 5 on the shaft 104. Each sector has a notch 161 at one end thereof and has an arcuate portion 162 adapted to be positioned beneath the pin 134 and prevent the release of the pin from one of the recesses 136. Each sector 160 also has secured thereto a lug 163 (see Fig. 1) adapted to engage the punch arm 100 or 101 and return the punch arm to initial position as hereinbefore described.

Each sector is actuated at each operation of the machine by means of a link 165 eccentrically connected at 166 to a gear 167. A gear 167 is provided for each set of selector keys, one of the shafts 168 being mounted on the partition 27 and the other being mounted on the partition 28. The gears 167 are driven by gears 170 which are mounted on and driven by the shaft 70. Thus at each revolution of the gears 167, the sectors 160 will be oscillated, and when the sectors are so positioned that the notches 161 therein are disposed beneath the locking pin 134, the pins can be released from the recesses 136. The operations are so timed that when a key is depressed, the sector will be swung in an anti-clockwise direction immediately to release the locking pin 134 controlled thereby, permitting the punch mechanism to swing upwardly until it engages the depressed key, whereupon the locking pin 134 will enter the recess corresponding to the first key and will be locked therein by the sector which is returned to its locking position.

*Punch operating means*

The shaft 70, as above stated, has secured thereto a pair of gears 170 and each gear carries a roller 171 adapted to engage the lower end 172 of lever 118 and swing the lever in a clockwise direction about its pivot, thereby forcing the arm 117 of the lever and the arm 122 inwardly to actuate the punch mechanism providing the punch mechanism has moved up into engagement with a depressed key.

Each lever 118 also has formed thereon a laterally extending arm 173 adapted to be engaged by a lug 174 which is also carried by the gear 170. The roller 171 actuates the lever mechanism to operate the punch and the engagement of the lug 174 with arm 173 returns the lever to its initial position.

*Locking mechanism and feeding mechanism for check strip feed*

The checks or tickets may be drawn from a feed roll or from a zig-zag supply package and the strip has formed therein at each end of each check, a perforation, a portion of these perforations being shown at 180 in Fig. 8. These perforations receive peripheral lugs or pins 181 carried by the outer periphery of a central disk 182 rotatably mounted on the shaft 104. During the passage of the strip through the machine and the feeding of the strip by the disk, the strip is supported on surfaces 176 carried by a supporting mmeber 177. The hub 184 of the disk 182 has fixed thereto a disk 185 having radial notches 186 formed therein, as shown in Fig. 1.

In order to lock the disk 182 against movement during the punching operation and during the cutting operation, a lever 187 is pivoted at 188 to a fixed pivot carried by the partition 28 and a stud 189 is mounted on one end of the lever and is positioned to enter the notches 186 of the disk 185.

The movement of the lever 187 is controlled by means of a cam 190 having a circular or cylindrical portion 191 upon which a roller 192 carried by the free end of the lever 187 rides during the major portion of the cycle of movement of the parts to retain the stud 189 in one of the slots 186 of the disk 185 and lock the disk 185 and disk 182 against movement. However, when the punch mechanism has been operated and it is desired to feed the check strip and sever the punched check, the roller 192 under the actuation of a spring 193 will engage a projecting portion 195 of the cam 190, thereby causing the lever 187 to move in a counter-clockwise direction, releasing the stud 189 from the notch 186 and permitting the rotation of the disks 182 and 185.

When the locking means for the disk has been released in the manner just set forth, disk rotating means is brought into operation in the following manner: A disk 200 is fixed to the shaft 70 and carries on one face adjacent its periphery, a pin 201 adapted to enter at a predetermined point in the cycle of operation of the parts one of the four radial notches 202 formed in a Geneva wheel 203 rotatably mounted on a stud 204 carried by the partition 27. The disk 200 also has secured thereto a disk 205 so formed as to co-operate with the recessed arcuate portions 206 of the Geneva wheel in the well known manner to prevent rotation of the wheel except when the pin 201 is in operative position in one of the notches 202. A gear 207 is secured to the Geneva wheel 203 and is rotated therewith and this gear is connected through an idler gear 208 to a gear 209 mounted on the hub 184 of the disk 182. The parts are so timed that when the disk 182 has been released from its lock, the Geneva wheel will be operated to rotate the disk and feed the check strip a distance corresponding to the length of one check. When the check strip has been so fed, the cutting or severing mechanism is brought into operation in the following manner.

*Check severing means*

Figure 10:
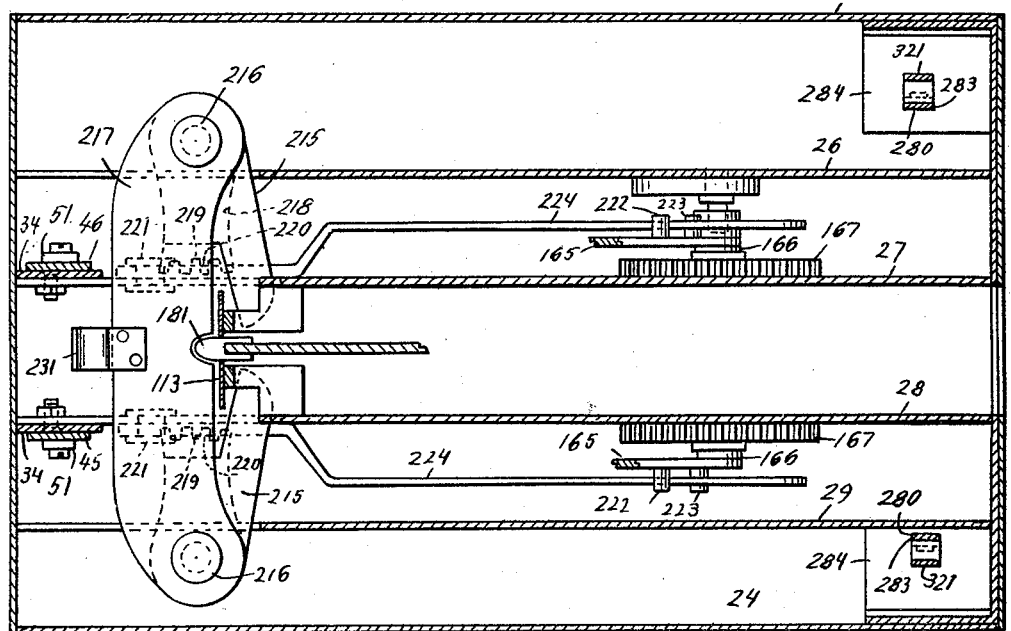
Fig. 10 is a view similar to Fig. 9 taken substantially on line 10—10 of Fig. 1, showing the cutting or check severing mechanism.

The check cutting or severing mechanism is illustrated particularly in Figs. 1 and 10. The cutting means consists of a pair of knives or blades 215 pivotally mounted at 216 to opposite ends of a plate 217 carried by the machine frame. The knives 215 are spaced apart at their free ends and operate on the portions of the check strip extending laterally from the perforations 180 therein. In the form of the invention illustrated, each knife has connected thereto a sector 218 having teeth meshing with teeth 219 formed at the upper end of a bell crank lever 220 pivoted at 221.

Each bell crank lever 220 is actuated to operate the cutting knives by means of a pair of laterally projecting lugs 222 and 223 which are carried by the links 165 and are disposed on opposite sides of the arm 224 of bell crank lever 220. As either of the links 165 is oscillated by the rotation of the gear connected thereto, the bell crank lever 220 controlled thereby will be oscillated about its pivot 221 and the operations of the parts are so timed that the strip will have been punched and will be in position for cutting when the lug 223 engages and swings the bell crank lever 220 in an anti-clockwise direction. The lever will be returned to its initial position by the lug 222, thus retracting the knives.

It will be understood that two bell crank levers are provided, one for each set of selector keys, so that when the machine is set in operation by the depression of a key in either set, one of the bell crank levers will be actuated to cause the knives to operate and cut the strip.

*Indicator mechanism*

After each operation of the machine set in motion by the depression of one of the selector keys, the amount punched on the check is visibly indicated to the customer by means of indicator mechanism.

This mechanism comprises a set of indicators or flashers for each bank or set of keys. A separate flasher is provided for each key and means is provided for raising each flasher as its corresponding key is actuated. This is accomplished as follows.

Two sets of indicators or flashers A and B (see Fig. 12), are provided, each set comprising a plurality of indicators 275 pivoted on a horizontal pivot pin or spindle 276.

The indicators 275 normally rest on a stop 277, being held in unexposed or depressed position by gravity.

The flashers are operated selectively as the selector keys are depressed and the punching mechanism is set in operation. The operation of the flashers or indicators of each set is directly effected by means of a push bar 280 having a bifurcated upper end 281. The bars 280 are movable on pivots 282 at their lower ends in such a manner that each bar can be positioned below and in a position to operate any one of the flashers of the set of flashers controlled by the bar. The bars extend at their lower ends through openings 283 in a plate or bracket 284 fixed to the frame of the machine.

Each bar 280 extends intermediate its ends through a slot in a rack bar 290 which is slidably mounted in a bracket 291 and has rack teeth 292 formed on or connected thereto, which in turn mesh with a pinion 293 rotatably mounted on the shaft or spindle 104. A spring 294 is connected to the rack bar, as shown in Fig. 1, and normally tends to pull the bar in a direction to position the push bar 280 to its extreme left hand or neutral position, viewing Fig. 1.

Each pinion 293 has connected thereto and movable therewith, a segment 295 having ratchet teeth 296 on the periphery thereof. Each segment 295 has a stud 300 extending laterally therefrom and positioned in the path of movement of a stud 301 which projects laterally from the punch arm 100 or 101. It will be remembered that the punch arm 100 cooperates with one set of keys and the other punch arm 101 cooperates with the other set of keys. The indicator or flasher mechanism for each set of keys operates exactly in the same manner as for the other set and, therefore, a separate description of each set is not necessary.

In order to hold each segment 295 in the position to which it is moved by the punch arm, a pawl 305 is pivotally mounted on a pivot 306 and is normally swung on its pivot by a spring 307 in a direction to cause the pawl tooth 308 to engage one of the teeth of the segment 295. Each pawl has a tail 309 which is so positioned as to be engaged by the pin 120 of the pin and slot connection between the arm 117 and arm 122. It will be remembered that when the shaft 70 is rotated, the roller 171 engages the lower end 172 of the lever 118, swinging the lever in a clockwise direction about its pivot, thereby forcing the arm 117, the arm 122 and the pin 120 inwardly, actuating the punch mechanism provided the punch mechanism has moved up into engagement with the depressed key.

When the arm 117 and the arm 122 are moved inwardly, the pin 120 will engage the tail 309 of the pawl 305 and release the pawl tooth 308 from the segment teeth 296.

In the foregoing specification the operations which take place on the depression of a selector key have been outlined. It has been explained that when a key is depressed, the motor circuit is closed, the punching mechanism moves upwardly to a position determined by the depressed key, and the punch then operates to punch the ticket to indicate a sale corresponding to the key depressed. At the same time, the stud 301 carried by the punch arm 100 or 101 will engage the stud 300 carried by the segment 295 and will move the segment to a position corresponding to the position taken by the punch arm or, in other words, to the position determined by the selector key depressed. The movement of the segment will cause a corresponding movement of the pinion 293 and through the rack 290 will cause the push bar 280 to be positioned beneath the indicator or flasher corresponding to the selector key depressed.

After the foregoing operations have been completed, the push bar 280 is actuated to raise the indicator or flasher which is disposed above the bar. This is accomplished in the following manner.

The operating mechanism for the push bars is illustrated particularly in Fig. 4. Shaft 82 has secured thereto an arm 315 to which is connected a link 316, the opposite end of which is connected to a lever 317 mounted on a fixed pivot 318. The link 316 is connected to an arm 319 of the lever 317 and the lever has another arm 320 which is connected by a link 321 to the push bar 280. Thus, as the shaft 83 moved in an anti-clockwise direction, the arm 315 will actuate the link 316, which in turn, through the lever 317, will actuate link 321 to raise the push bar 280 and the indicator or flasher positioned above the bar.

It will be remembered from the foregoing description that the shaft 82 is moved in a clockwise direction by the depression of one of the selector keys, thus causing the latch 80 to release the lug 79 carried by the plate 75. When this lug is released, the plate 75 will be swung in a counter-clockwise direction, viewing Fig. 4, causing the pin 77 carried by the pawl 72 to travel downwardly in the slot 76 or toward the axis of the plate and into operative position with respect to the ratchet 71.

After the shaft 70 has completed its cycle of operation, the cam 253 will swing the lever 250 on its pivot 251, thus elevating the pin or rod 90 which is carried by the arm 84 mounted on the shaft 82. This will cause the shaft 82 to swing in an anti-clockwise direction or in a direction to actuate the flasher mechanism in the manner above described.

After an indicator or flasher has been operated it will remain in elevated position until the next operation of the machine. The depression of a selector key will rotate shaft 82 in a clockwise direction causing arm 315 through the connections described to lower the flasher or indicator which was elevated by the previously operated key. The pawl 305 will release the segment 295 and permit the spring 294 to swing the segment to the new location of the punch arm corresponding to the key which has been actuated. If the same key is successively depressed the segment will not change its position.

From the foregoing description it will be clear that as a selector key is operated, the machine will be set in operation, causing the punch mechanism to be elevated to a position corresponding to the key depressed and to punch the check or ticket. Furthermore, the movement of the punch mechanism to operative position will cause the push bar 280 to elevate the indicator or flasher corresponding to the depressed key. Upon the completion of the cycle of operation of the machine, the flasher or indicator will remain in elevated position until the next operation, whereupon the push bar will be positioned beneath the indicator corresponding to the next key depressed. Furthermore, the strip severing mechanism will operate to sever the punched check or ticket.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A register comprising means for supporting and feeding a strip, punching mechanism movable to a plurality of positions relative to said strip, for indicating on the strip the amount of a sale, an indicator for visibly indicating to the customer the amount designated on the strip, and means controlled by the position and operation of said punching mechanism for operating said indicator.

2. A register comprising means for supporting and feeding a strip, a plurality of selector keys, punching mechanism controlled by said keys and movable to a plurality of positions relative to said strip for indicating on the strip the amount of a sale, a plurality of indicators for visibly indicating to the customer the amount designated on the strip, and selective means controlled by the position and operation of said punching mechanism for operating said indicators.

3. A register comprising means for supporting and feeding a strip, punching mechanism movable to a plurality of positions relative to said strip, for indicating on the strip the amount of a sale, a plurality of indicators for showing the amount of a sale, a member for selectively operating said indicators, and means controlled by the position and operation of said punching mechanism for positioning said member in operative relation with respect to one of said indicators.

4. A register comprising means for supporting and feeding a strip of checks, mechanism movable to a plurality of positions with respect to said strip for designating at different positions thereon the amount of a sale, a plurality of selector keys adapted to selectively determine the position of operation of said mechanism, and a plurality of visible indicating elements selectively operatable and controlled by said mechanism for indicating the amount of the sale.

5. A machine of the character described comprising means for supporting and feeding a strip, mechanism movable to different positions relative to the strip for designating on the strip at certain positions the amount of a sale, a plurality of indicators adapted to visibly indicate to a customer the amount designated, means for selectively raising the indicator corresponding to the amount designated on the strip, and means controlled by the movement of said designating mechanism for positioning said selective raising means.

6. A machine of the character described comprising means for supporting and feeding a strip, a plurality of selector keys, means controlled by said keys and movable to a plurality of positions relative to said strip for designating on said strip at said positions amounts corresponding to the keys operated, a plurality of indicators for visibly indicating the amounts corresponding to the keys operated, and means controlled by the movement of said designating means for operating said indicators.

7. A machine of the character described comprising means for supporting and feeding a strip, a plurality of selector keys, means controlled by said keys for designating on said strip amounts corresponding to the keys operated, a plurality of indicators for visibly indicating the amounts corresponding to the keys operated, and means including a member selectively engageable with said indicators and controlled by said designating means for operating said indicators.

8. A machine of the character described comprising means for supporting and feeding a strip, a plurality of selector keys, punching mechanism movable to a plurality of positions relative to said strip and controlled by said keys, a plurality of indicators for indicating amounts designated on the strip by said punching mechanism, means for selectively operating said indicators and including a member engageable therewith, and means movable with said punching mechanism for positioning said member relative to said indicators.

9. A machine of the character described comprising means for supporting and feeding a strip, a plurality of selector keys, punching mechanism movable to a plurality of positions relative to said strip and controlled by said keys, a plurality of indicators for indicating amounts designated on the strip by said punching mechanism, means for selectively operating said indicators and including a member engageable therewith, means movable with said punching mechanism for positioning said member relative to said indicators, releasable means for holding said member in adjusted position, and means controlled by the operation of the punch mechanism for releasing said holding means.

REUBEN H. HELSEL.